(12) United States Patent
Yamazaki

(10) Patent No.: US 8,369,641 B2
(45) Date of Patent: Feb. 5, 2013

(54) IMAGE PROCESSING APPARATUS, DISPLAY DEVICE, AND IMAGE PROCESSING METHOD

(75) Inventor: Susumu Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 574 days.

(21) Appl. No.: 12/692,324

(22) Filed: Jan. 22, 2010

(65) Prior Publication Data

US 2010/0290670 A1 Nov. 18, 2010

(30) Foreign Application Priority Data

May 15, 2009 (JP) ................................ 2009-119178

(51) Int. Cl.
*G06K 9/40* (2006.01)
(52) U.S. Cl. ...................................................... 382/254
(58) Field of Classification Search .................. 33/18.3, 33/20.3, 432; 348/369; 382/254; 463/33; 715/781
See application file for complete search history.

(56) References Cited

U.S. PATENT DOCUMENTS

| 6,963,365 B2 | 11/2005 | Baron |
| 2002/0118292 A1 | 8/2002 | Baron |
| 2003/0080979 A1* | 5/2003 | Satoh et al. ................ 345/633 |
| 2008/0024607 A1* | 1/2008 | Ozaki ........................ 348/148 |
| 2010/0232683 A1* | 9/2010 | Fujieda et al. ............. 382/154 |
| 2011/0149089 A1* | 6/2011 | Yang ....................... 348/207.1 |

FOREIGN PATENT DOCUMENTS

| JP | 2002-335438 | 11/2002 |
| JP | 2003-323170 | 11/2003 |
| JP | 2004-012717 | 1/2004 |
| JP | 2005-094202 | 4/2005 |
| JP | 2007-322452 | 12/2007 |
| JP | 2008-238927 | 10/2008 |

* cited by examiner

*Primary Examiner* — Gregory F Cunningham
(74) *Attorney, Agent, or Firm* — Blakely, Sokoloff, Taylor & Zafman LLP

(57) ABSTRACT

According to one embodiment, an image processing apparatus includes an extracted coordinates setting module, an image generator, and an output module. The extracted coordinates setting module sets extracted coordinates in a captured image along a direction in which a viewpoint moves with respect to an object in the captured image. The image generator sequentially extracts partial areas from the captured image in which perspective deformation of the object has been corrected based on the extracted coordinates, and generates a plurality of partial area images from the partial areas. The partial areas are in a size corresponding to the viewing angle of the human eye calculated according to an angle of view of the captured image. The output module outputs a moving image including the partial area images as frames.

7 Claims, 7 Drawing Sheets

IMAGE CAPTURING SURFACE

BACK PROJECTION PLANE M1 (BEFORE ADJUSTMENT)

IMAGE CAPTURING SURFACE

BACK PROJECTION PLANE M2 (ADJUSTED TO BE PARALLEL TO IMAGE CAPTURING SURFACE)

CHANGE ANGLE OF VIEW (a≥b)

IMAGE PROCESSING APPARATUS, DISPLAY DEVICE, AND IMAGE PROCESSING METHOD

CROSS-REFERENCE TO RELATED APPLICATIONS

This application is based upon and claims the benefit of priority from Japanese Patent Application No. 2009-119178, filed May 15, 2009, the entire contents of which are incorporated herein by reference.

BACKGROUND

1. Field

One embodiment of the invention relates to an image processing apparatus, a display device, and an image processing method.

2. Description of the Related Art

Perspective deformation recovery is image processing performed on a captured still image (hereinafter, "captured image") to correct perspective deformation. The perspective deformation frequently occurs in an image captured with a wide-angle lens and looks unnatural or strange to the human eye. The perspective deformation recovery corrects only perspective deformation in a captured image without changing the range of an object therein, and corresponds to the effect of a tilt-shift lens that is a type of an optical lens. For example, Japanese Patent Application Publication (KOKAI) No. 2002-335438 discloses a conventional digital camera provided with a processor to eliminate perspective deformation.

With the conventional digital camera, although perspective deformation in a captured image is corrected, the captured image is not converted to suit the natural viewing angle of the human eye. Therefore, the user may not experience the same sensation as he/she does when viewing the real scene through the captured image obtained by the image processing. For example, in a wide-angle captured image that requires perspective deformation recovery, a range substantially wider than the viewing angle of the human eye is sometimes captured. In such a case, by only the correction of perspective deformation, the captured image looks different from the scenery viewed by the human eye and unnatural.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an image processing apparatus comprises an extracted coordinates setting module, an image generator, and an output module. The extracted coordinates setting module is configured to set extracted coordinates in a captured image along a direction in which a viewpoint moves with respect to an object in the captured image. The image generator is configured to sequentially extract partial areas from the captured image in which perspective deformation of the object has been corrected based on the extracted coordinates, and generate a plurality of partial area images from the partial areas. The partial areas are in a size corresponding to the viewing angle of the human eye calculated according to an angle of view of the captured image. The output module is configured to output a moving image including the partial area images as frames.

According to another embodiment of the invention, a display device comprises a receiver, an extracted coordinates setting module, an image generator, an output module, and a display module. The receiver is configured to receive a captured image and information on the captured image. The extracted coordinates setting module is configured to set extracted coordinates in a captured image along a direction in which a viewpoint moves with respect to an object in the captured image. The image generator is configured to sequentially extract partial areas from the captured image in which perspective deformation of the object has been corrected based on the extracted coordinates, and generate a plurality of partial area images from the partial areas. The partial areas are in a size corresponding to the viewing angle of the human eye calculated according to an angle of view of the captured image. The output module is configured to output a moving image including the partial area images as frames. The display module is configured to display the moving image.

According to still another embodiment of the invention, there is provided an image processing method applied to an image processing apparatus. The image processing method comprises: an extracted coordinates setting module setting extracted coordinates in a captured image along a direction in which a viewpoint moves with respect to an object in the captured image; an image generator sequentially extracting partial areas from the captured image in which perspective deformation of the object has been corrected based on the extracted coordinates, and generating a plurality of partial area images from the partial areas, the partial areas being in a size corresponding to the viewing angle of the human eye calculated according to an angle of view of the captured image; and an output module outputting a moving image including the partial area images as frames.

Figure 1:
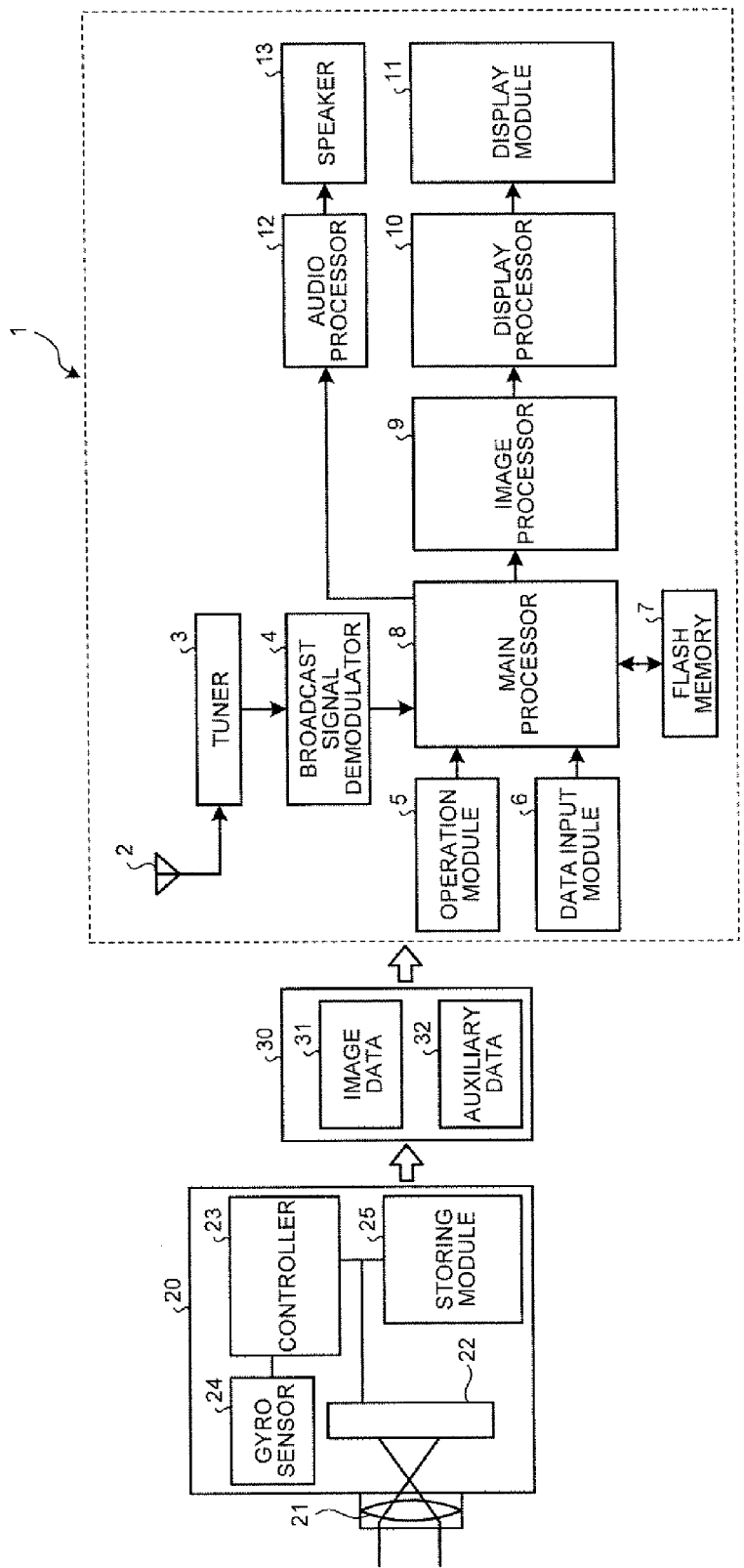
FIG. 1 is an exemplary block diagram of a display device according to an embodiment of the invention.

FIG. 1 is a block diagram of a display device 1 according to an embodiment of the invention. In the embodiment, the display device 1 is described by way of example as a digital television.

As illustrated in FIG. 1, the display device 1 comprises an antenna 2, a tuner 3, a broadcast signal demodulator 4, an operation module 5, a data input module 6, a flash memory 7, a main processor 8, an image processor 9, a display processor 10, a display module 11, an audio processor 12, and a speaker 13.

The antenna 2 receives analog broadcasting as well as digital broadcasting such as broadcasting satellite (BS) broadcasting, communications satellite (CS) broadcasting, and digital terrestrial broadcasting. The digital broadcasting includes, in addition to video, data broadcasting, data on electronic program guide (EPG), and the like. The tuner 3 is used to select a channel to view specified by the user in the digital broadcasting and the analog broadcasting received by the antenna 2. The broadcast signal demodulator 4 performs signal processing such as the demodulation of an input broadcast signal.

The operation module 5 comprises operation keys, a remote controller, and the like to receive an instruction from the user. An instruction received from the user through the operation module 5 is output to the main processor 8 as an operation signal. With the operation module 5, the user inputs extracted path information, which will be described later.

The data input module 6 comprises an interface, a reader, and a signal processing circuit (all not illustrated). The interface receives data from an external device. The reader may be, for example, an optical drive or a memory slot to read data stored in a storage medium 30. The signal processing circuit performs signal processing corresponding to the specification of input data, and outputs the data to the main processor 8 after the signal processing.

For example, the data input module 6 receives data from external devices including a digital camera 20, a personal computer (PC), and a digital versatile disk (DVD) player connected via an input terminal such as an institute of electrical and electronic engineers 1394 (IEEE 1394) bus, a universal serial bus (USB), a high-definition multimedia interface (HDMI), and the like. Besides, the data input module 6 reads data stored in the storage medium 30 by an external device such as the digital camera 20. The storage medium 30 may be any data writable/readable medium. Examples of the storage medium 30 include a semiconductor memory such as a memory card, DVD, a compact disk read-only memory (CD-ROM).

Incidentally, it is assumed herein that the data input module 6 receives through the storage medium 30 image data 31 representing an image captured by the digital camera 20 and auxiliary data 32 related to the captured image. The data input module 6 need not necessarily receive the image data 31 and the auxiliary data 32 through the storage medium 30, and may receive them through the input terminal thereof.

The flash memory 7 stores data necessary for the main processor 8. More specifically, the flash memory 7 stores programs to be executed by the main processor 8 and various types of setting information.

The main processor 8 comprises a central processing unit (CPU), a microcontroller, an internal random access memory (RAM), and the like, and controls the overall operation of the display device 1. More specifically, the main processor 8 loads predetermined programs stored in the flash memory 7 into the work area of the internal RAM and sequentially executes them, thereby outputting a control signal to each module of the display device 1.

Under the control of the main processor 8, the image processor 9 performs predetermined image processing on input image data and outputs it to the display processor 10. More specifically, upon receipt of image data contained in a broadcast signal received by the antenna 2 and the tuner 3 and demodulated by the broadcast signal demodulator 4, the image processor 9 performs image conversion such as scaling, luminance conversion, and the like, and outputs the converted image data to the display processor 10.

In addition, the image processor 9 generates image data based on the image data 31 and the auxiliary data 32 received through the data input module 6 to display a captured image on the display module 11 as an image that provides the user with a realistic sensation as if he/she is viewing the real scene. More specifically, the image processor 9 corrects perspective deformation of an input captured image so that it looks natural. Further, the image processor 9 extracts areas each covering an angle of view corresponding to the viewing angle of the human eye and generates moving image data in which the extracted areas are sequentially shifted or switched. This image processing to generate the moving image data will be described in detail later.

The display processor 10 may be, for example, a display driver or the like, and controls the display of an image signal received from the image processor 9 on the display module 11. The display module 11 may be, for example, a liquid crystal display (LCD) panel, a plasma panel, a surface-conduction electron-emitter display (SED) panel, or the like. Under the control of the display processor 10, the display module 11 displays a screen corresponding to an image signal.

The audio processor 12 converts a digital audio signal received from the main processor 8 to an analog audio signal in a format reproducible by the speaker 13 as well as amplifying the signal, thereby outputting it to the speaker 13. The speaker 13 outputs audio corresponding to the analog audio signal received from the audio processor 12.

In the following, the digital camera 20 will be described in detail. The digital camera 20 comprises an optical lens 21, an image sensor 22, a controller 23, a gyrosensor 24, a storing module 25.

The optical lens 21 forms the image of an object on the image sensor 22. The image sensor 22 may be, for example, a complementary metal-oxide semiconductor (CMOS) image sensor, a charge-coupled device (CCD), or the like, and converts the optical image of the object into an electrical signal to obtain a captured image.

The controller 23 comprises a microcomputer, a ROM that stores programs, various types of setting information, etc., and the like. The microcomputer sequentially executes the programs such that the controller 23 controls the overall operation of the digital camera 20.

The gyrosensor 24 detects a posture (for example, elevation and depression angles) of the digital camera 20 with respect to the vertical direction, and outputs the detection result to the controller 23 in a form of a detection signal. From the output of the gyrosensor 24, the digital camera 20 can specify the angle of the direction (image capturing direction) in which the surface (image capturing surface) of the image sensor 22 faces with respect to the horizontal plane upon capturing an image through the image sensor 22. For example, the digital camera 20 may specify an elevation angle when capturing an image at an angle, i.e., in an image capturing direction, from the horizontal plane toward upward. Similarly, the digital camera 20 may specify a depression angle when capturing an image at an angle from the horizontal plane toward downward. The angle of the image capturing direction with respect to the horizontal plane (elevation or depression angle) indicates the direction of the image capturing surface upon capturing an image.

The controller 23 performs imaging processing to control the storing module 25 to store an image captured by the image sensor 22 and information related to the captured image (auxiliary data) in the storage medium 30 or the like. Examples of the information related to the captured image include information on the angle of view of the optical lens 21 stored in advance in ROM or the like, information on the image capturing direction such as elevation and depression angles based on the output of the gyrosensor 24, information to be stored in the exchangeable image file format (Exif) header such as shooting date and time, and the like.

The storing module 25 stores an image captured by the image sensor 22 and information related to the captured image in an internal memory (not illustrated), the storage medium 30, etc. as the image data 31 and the auxiliary data 32, respectively, under the control of the controller 23.

The image data 31 stored by the storing module 25 may be joint photographic experts group (JPEG) data, tagged image file format (TIFF) data, RAW data, or the like. The auxiliary data 32 may be, for example, Exif header. Among information related to a captured image, information not preset as a tag of the Exif header such as, for example, information on the image capturing direction including elevation and depression angles, is assumed to be stored in an extension tag of the Exit header.

Figure 2:
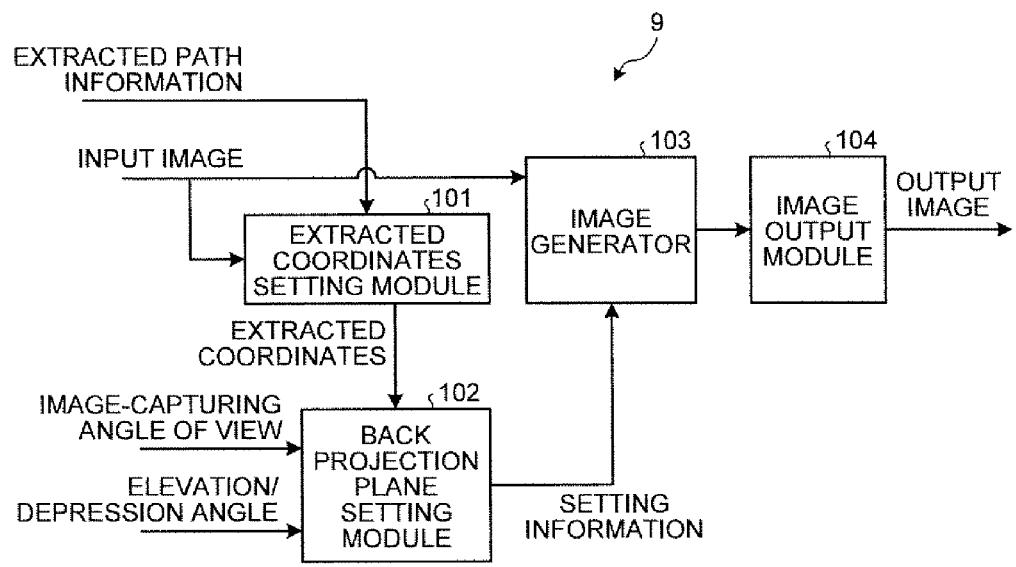
FIG. 2 is an exemplary block diagram of an image processor in the embodiment.

A detailed description will now be given of the configuration of the image processor 9 and image processing related to the generation of moving image data described above. FIG. 2 is a block diagram of the image processor 9. As illustrated in FIG. 2, the image processor 9 comprises an extracted coordinates setting module 101, a back projection plane setting module 102, an image generator 103, and an image output module 104.

The extracted coordinates setting module 101 receives the image data 31 (input image) and extracted path information input through the operation module 5. The extracted coordinates setting module 101 then sequentially sets extracted coordinates in the input image based on the extracted path information. The extracted coordinates setting module 101 outputs the extracted coordinates to the back projection plane setting module 102.

The extracted path information is provided by the user through the operation module 5 to be set in advance, and indicates the movement of the viewpoint of the user with respect to an object in the input image. The movement of the viewpoint indicates a path (moving direction) along which the viewpoint of the user moves when he/she is viewing the object in the input image. For example, in the case where the user views an input image in which a person as an object stands in front of a tall building and where the user looks at the building from the bottom to the top with the person as a starting point, a path extending from the person to the rooftop of the building represents the movement of the viewpoint specified by the extracted path information.

More specifically, the extracted path information includes the initial position of an area to be extracted, the moving direction, the amount of movement per unit time, and the like. The extracted coordinates setting module 101 obtains the initial position of an area to be extracted from an image, a moving direction in which the extracted area is continuously moved, and the moving speed based on the extracted path information, thereby outputting the results as extracted coordinates. The initial position may be the left or right corner, the top or bottom corner, or the center. The amount of movement per unit time may be represented by the number of pixels corresponding to movement per second.

The user sets the initial position upon viewing an object of an image, the viewing direction, the viewing speed, etc. as the extracted path information. For example, when viewing the object from the bottom to the top, the user sets the bottom of the image as the initial position and also upward direction as the viewing direction. Besides, when viewing the object at a slow pace, the user sets a small number of pixels corresponding to movement per second as the viewing speed.

Figure 3A:
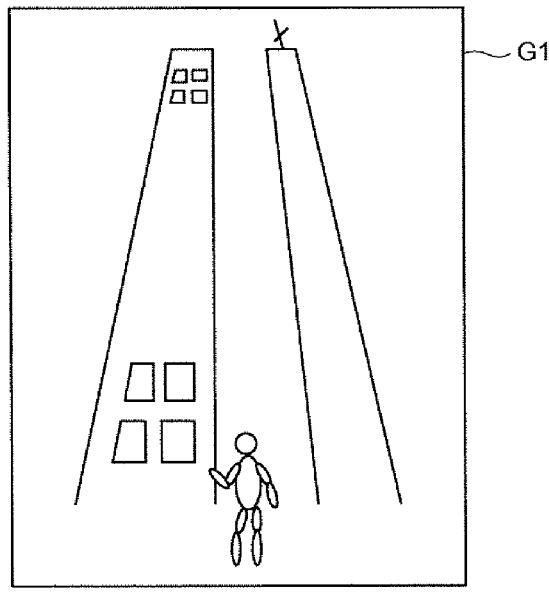
FIGS. 3A and 3B are exemplary schematic diagrams for explaining image capturing with a digital camera in the embodiment.
Figure 3B:
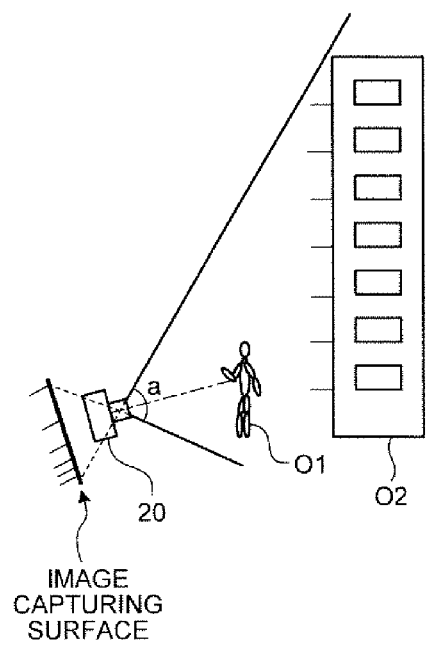

The input image is an image captured by the digital camera 20. FIGS. 3A and 3B are schematic diagrams for explaining image capturing by the digital camera 20. FIG. 3A illustrates a captured image G1 that is a still image of a person O1 and a building O2 captured by the digital camera 20 at an angle of view "a" as illustrated in FIG. 3B.

The human eye has a viewing angle of approximately 40° to 50°, while the angle of view "a" is very wide and about 80° to 90°. The captured image G1 captured at such a wide angle of view is different from the natural human sight in that the perspective is unnaturally enhanced. More specifically, the image capturing surface is inclined to fit the entire building O2 up to the top thereof in the photo, which causes perspective deformation. The perspective deformation is substantial depending on the inclination of the direction of the image capturing surface with respect to the horizontal direction (the inclination of the image capturing direction with respect to the horizontal direction). In the captured image G1, the top of the building looks excessively small compared to the bottom thereof, and also inclined toward the center of the captured image G1.

The back projection plane setting module 102 receives extracted coordinates sequentially output from the extracted coordinates setting module 101, an angle of view upon capturing an input image from the auxiliary data 32, and an elevation or depression angle indicating the inclination of the direction of the image capturing surface with respect to the horizontal direction, i.e., the angle of the direction of the image capturing surface (image capturing direction) with respect to the horizontal direction upon capturing the input image from the auxiliary data 32. Thus, the back projection plane setting module 102 sets a back projection plane to perform back projection of the captured image. The back projection plane refers to a display surface on which the captured image is to be back-projected. The back projection plane setting module 102 outputs information on the back projection plane to the image generator 103 as setting information. More specifically, the back projection plane setting module 102 sets the angle of the back projection plane to be parallel to the image capturing surface based on the elevation or depression angle indicating the inclination of the direction of the image capturing surface with respect to the horizontal direction.

Figure 4A:
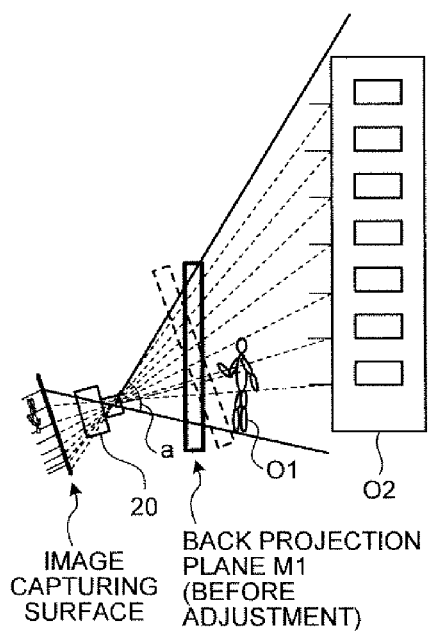
FIGS. 4A and 4B are exemplary schematic diagrams for explaining the setting of a back projection plane in the embodiment.
Figure 4B:
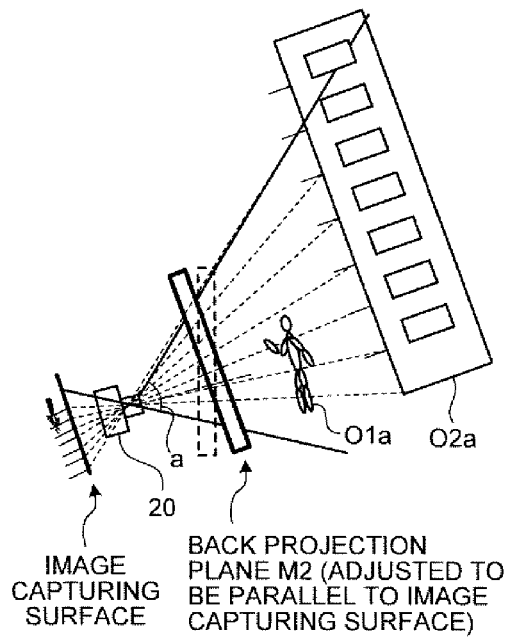

FIGS. 4A and 4B are schematic diagrams for explaining the setting of a back projection plane. In FIGS. 4A and 4B, it is assumed that an image is captured under the same conditions as in FIGS. 3A and 3B in terms of an angle of view upon capturing the image, the image capturing direction, objects, and the like. FIGS. 4A and 4B illustrate virtual back projection planes M1 and M2, respectively, in front of the digital camera 20. The back projection plane M1 is not parallel to the image capturing surface, while the back projection plane M2 is adjusted to be parallel to the image capturing surface. A person O1a and a building O2a are virtual objects on the back projection plane M2 adjusted to be parallel to the image capturing surface.

Comparing the back projection plane M1 before adjustment and the back projection plane M2 adjusted to be parallel to the image capturing surface, as illustrated in FIG. 4A, in the back projection plane M1, the lower portion of the building O2 is close to the image capturing surface, while the upper portion is distant therefrom. Accordingly, the captured image is projected such that the upper portion of the building O2 looks inclined toward the center of the captured image, which causes perspective deformation in the captured image. On the other hand, as illustrated in FIG. 4B, in the back projection plane M2 after adjustment, the upper and lower portions of the building O2a are separated by the same distance from the image capturing surface. This prevents the upper portion of the building O2a from looking inclined toward the center of the captured image. That is, the perspective deformation is corrected. However, a range that can be projected on the back projection plane M2 is smaller, and the upper portion of the building O2a does not fit in the photo.

Figure 5A:
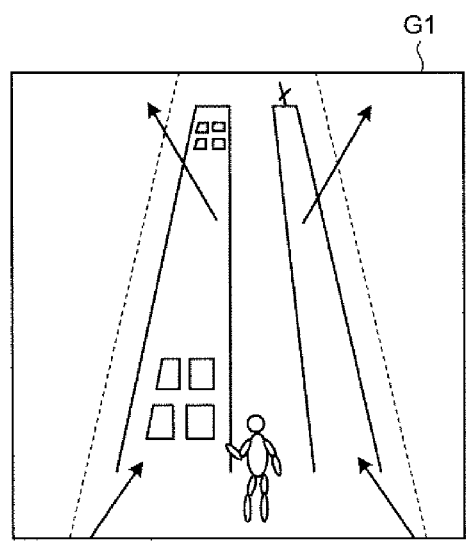
FIGS. 5A and 5B are exemplary schematic diagrams of captured images before and after the adjustment of the back projection plane in the embodiment.
Figure 5B:
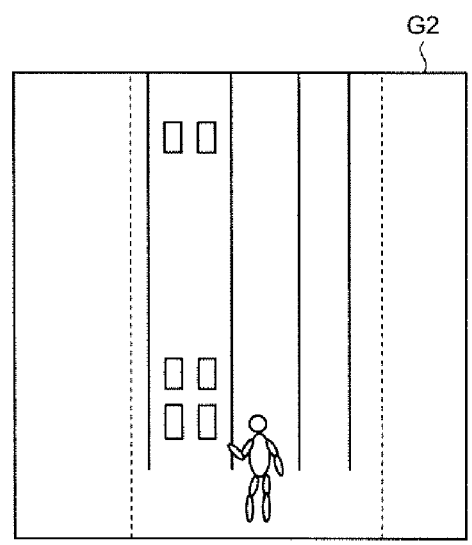

FIGS. 5A and 5B are schematic diagrams of examples of the captured image before and after the adjustment of the back projection plane. FIG. 5A illustrates the captured image G1 before the adjustment of the back projection plane. FIG. 5B illustrates a captured image G2 after the adjustment of the back projection plane. In FIGS. 5A and 5B, it is assumed that an image is captured under the same conditions as in FIGS. 3A and 3B in terms of an angle of view upon capturing the image, the image capturing direction, objects, and the like.

As illustrated in FIG. 5A, the captured image G1 is captured with the digital camera facing upward. In this case, buildings look inclined backward when viewed from the image capturing surface. Accordingly, in the captured image G1, the lower portions of the buildings look large, while the upper portions of the buildings look small as being inclined toward the center of the captured image G1. To adjust the captured image G1 to be parallel to the image capturing surface, according to the angle of the back projection plane set as described above, processing is performed to contract the lower portions toward the center and expand the upper portions toward outside the captured image G1. The captured image G2 represents the result of the processing. In the captured image G2, the buildings look vertical; however, the upper portions of the buildings are cropped.

Besides, the back projection plane setting module 102 obtains area information to extract an area corresponding to the viewing angle of the human eye from the input image after the adjustment of the angle of the back projection plane based on the extracted coordinates and the angle of view upon capturing the input image. The back projection plane setting module 102 then outputs the area information to the image generator 103 as setting information. More specifically, the back projection plane setting module 102 compare a predetermined viewing angle of the human eye and the angle of view upon capturing the input image to obtain the difference. The back projection plane setting module 102 calculates the size of an area corresponding to the viewing angle of the human eye in the input image after the adjustment of the angle of the back projection plane. The back projection plane setting module 102 calculates, as the area information, the coordinates of the area in the size taking the extracted coordinates as the center. The area information may be, for example, two coordinates to extract a rectangle area corresponding to the viewing angle of the human eye.

The image generator 103 corrects perspective deformation in the input image based on the setting information received from the back projection plane setting module 102. The image generator 103 sequentially extracts areas in the size of angle of view near the viewing angle of the human eye from the corrected image based on the extracted coordinates, and generates a plurality of images of the areas (partial area images). More specifically, the image generator 103 corrects the perspective deformation of the input image according to the angle of the back projection plane set by the back projection plane setting module 102. The image generator 103 then extracts areas from the corrected image based on the area information, and sequentially generates a plurality of images that closely match the viewing angle of the human eye and have no perspective deformation.

Figure 6A:
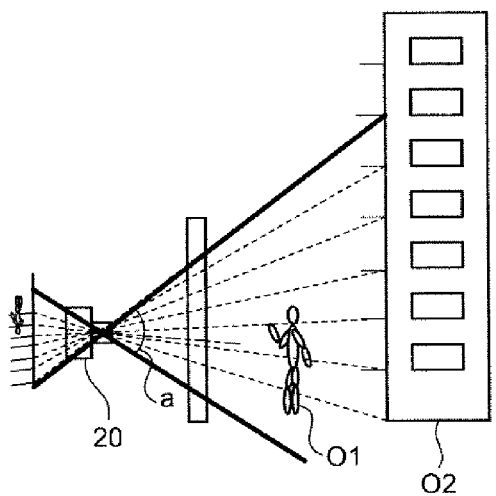
FIGS. 6A and 6B are exemplary schematic diagrams for explaining the change of the angle of view in the embodiment.
Figure 6B:
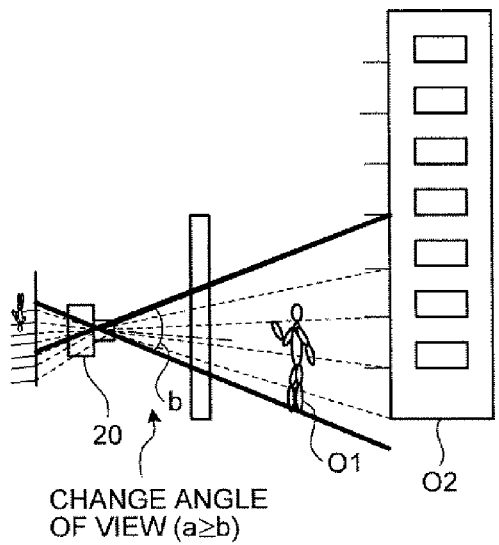

FIGS. 6A and 6B are schematic diagrams for explaining the change of the angle of view. FIGS. 6A and 6B correspond to FIG. 4B illustrating the back projection plane after adjustment, which is rotated so that the back projection plane is oriented vertically for better understanding. As illustrated in FIGS. 6A and 6B, the image generator 103 extracts the areas to change the very wide angle of view "a" of the input image to the viewing angle of the human eye "b", thereby changing the angle of view. In other words, the image generator 103 extracts part of areas that closely match the viewing angle of the human eye.

The image output module 104 generates a moving image of a predetermined number of frames based on the images output form the image generator 103, i.e., a plurality of images sequentially generated by the image generator 103. The image output module 104 outputs the moving image as an output image.

The images generated by the image generator 103 are extracted from the input image as those that closely match the viewing angle of the human eye and have no perspective deformation. The extracted areas sequentially shift based on the extracted path information. Thus, the image output module 104 outputs a moving image displaying an object of the input image as if viewed by the human eye.

Figure 7:
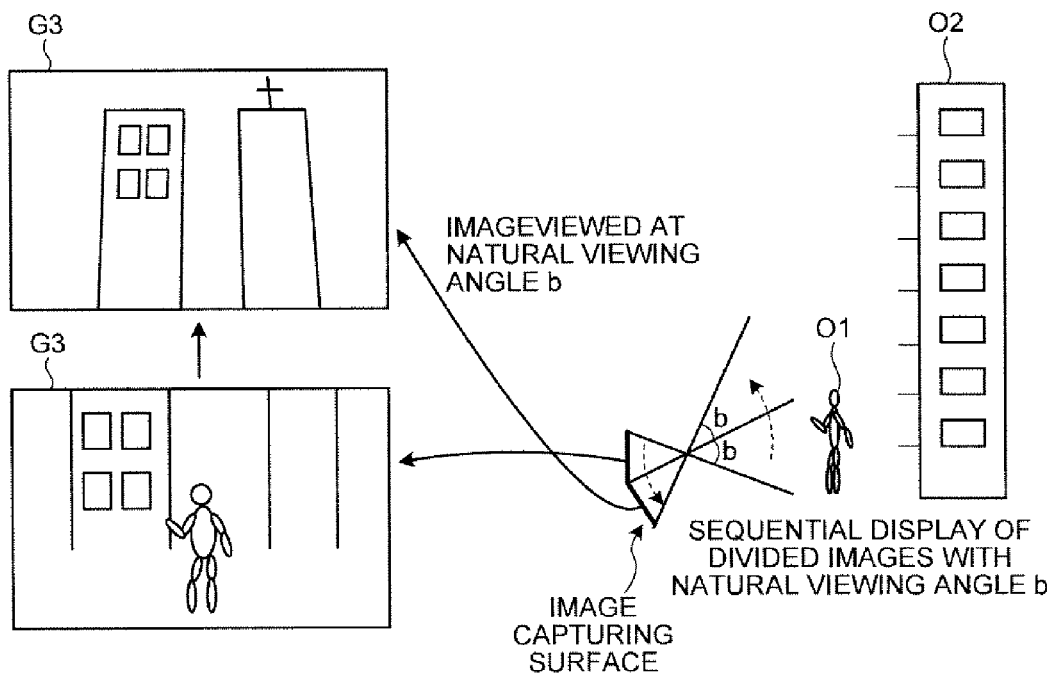
FIG. 7 is an exemplary schematic diagram of an output image in the embodiment.

FIG. 7 is a schematic diagram of examples of the output image. As illustrated in FIG. 7, perspective deformation is corrected in an output image G3 from the image output module 104 such that the output image G3 looks natural. The output image G3 is a moving image in which display areas that closely match the viewing angle of the human eye sequentially shift. In the example of FIG. 7, the extracted path information is set to indicate movement from the bottom to the top. That is, in the moving image, areas extracted at the natural viewing angle of the human eye "b" sequentially shift from the bottom to the top of the captured image after perspective deformation recovery.

The back projection plane setting module 102 may correct the angle of the image capturing surface such that the captured image appears as if the user looks at the lower portion thereof from the front and looks up the upper portion. More specifically, the back projection plane setting module 102 corrects the angle of the image capturing surface based on the position of the extracted coordinates set by the extracted coordinates setting module 101 in the captured image. The back projection plane setting module 102 sets the back projection plane to be parallel to the image capturing surface after the correction. As described above, the image generator 103 corrects perspective deformation by the back projection plane set based on the correction of the image capturing surface. Thus, a captured image can be corrected to closely match the viewing angle of the human eye, and the output image from the image output module 104 can be a moving image with more realistic sensations.

Figure 8:
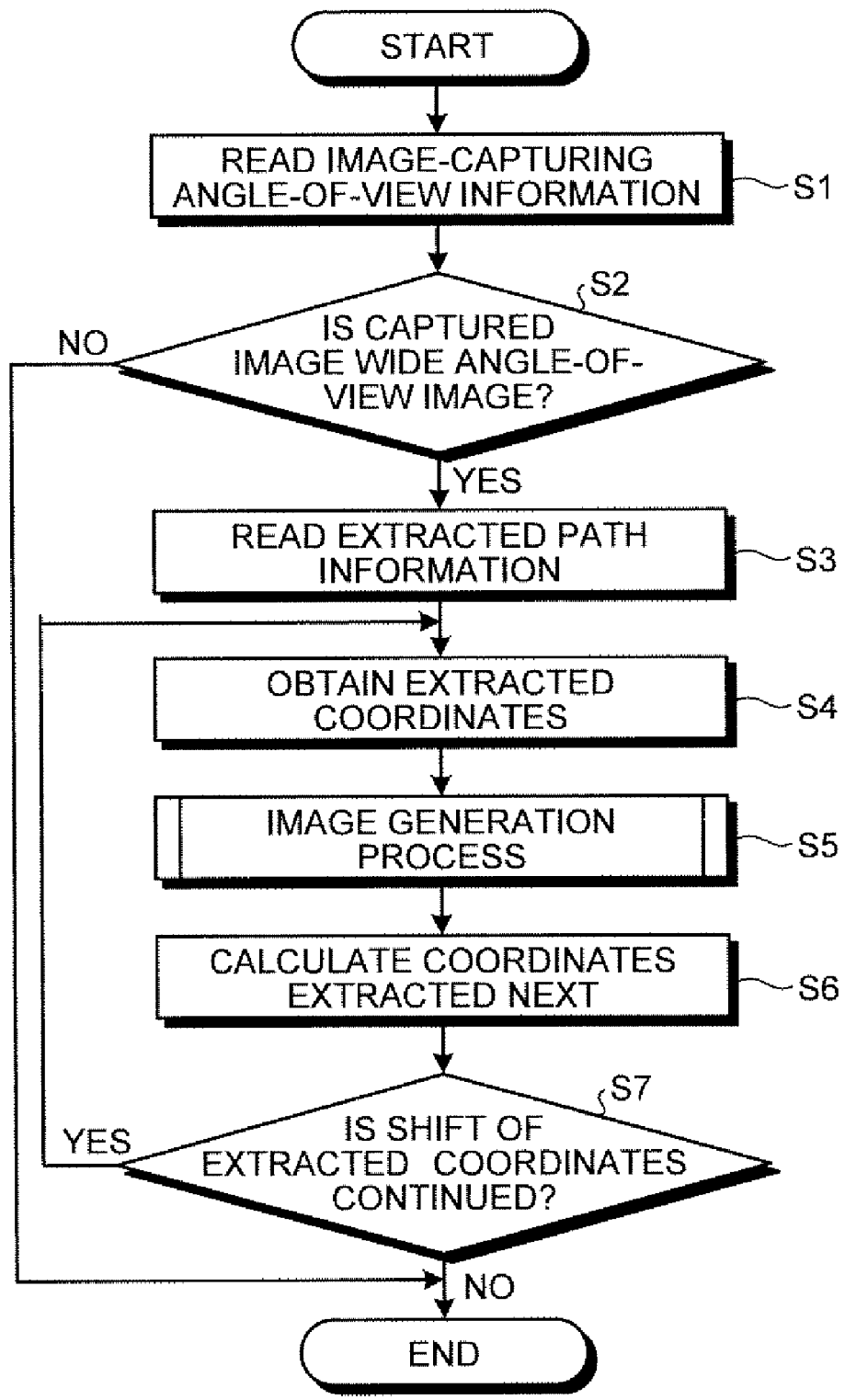
FIG. 8 is an exemplary flowchart of image processing performed by the display device in the embodiment.
Figure 9:
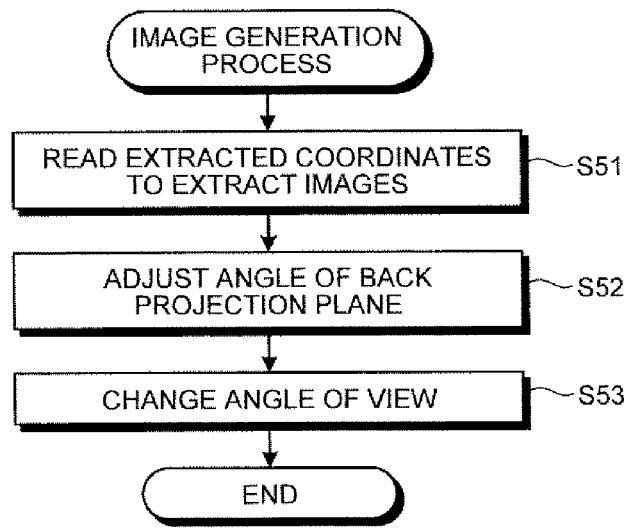
FIG. 9 is an exemplary flowchart of an image generation process to generate an image with an appropriate angle of view in the embodiment.

In the following, a description will be given of image processing performed by the image processor 9 of the display device 1 with reference to FIGS. 8 and 9. FIG. 8 is a flowchart of the image processing performed by the display device 1. FIG. 9 is a flowchart of an image generation process to generate images with an appropriate angle of view.

As illustrated in FIG. 8, first, the image processor 9 reads angle-of-view information indicating an angle of view upon capturing an image (input image) from the auxiliary data 32 (S1). The image processor 9 then determines whether the captured image is a wide angle-of-view image based on the angle-of-view information (S2).

More specifically, the image processor 9 determines whether the angle of view of the captured image is equal to or wider than a predetermined threshold. Incidentally, at S2, an angle of view at which a wider range than that of the viewing angle of the human eye is captured may be set as the threshold, and the image processor 9 may determine whether the angle of view of the captured image is equal to or wider than the viewing angle of the human eye.

If the captured image is a wide angle-of-view image (Yes at S2), the image processor 9 reads extracted path information provided through the operation module 5 (S3). The extracted coordinates setting module 101 obtains extracted coordinates based on the extracted path information (S4). After that, in the image processor 9, the image generator 103 performs an image generation process to generate images with an appropriate angle of view (S5).

As described above, in the image generation process, the angle of the back projection plane is adjusted to correct perspective deformation, and images with an angle of view that matches the viewing angle of the human eye are generated from the corrected image. More specifically, as illustrated in FIG. 9, first, the image generator 103 reads the extracted coordinates to extract images with an angle of view that match the viewing angle of the human eye from the setting information output from the back projection plane setting module 102 (S51).

The image generator 103 then adjusts the angle of the back projection plane of the captured image such that the back projection plane is parallel to the image capturing surface based on the angle of the back projection plane set by the back projection plane setting module 102 (S52). Thereafter, the image generator 103 extracts areas from the image where the angle of the back projection plane has been adjusted based on the setting information, thereby changing the angle of view of the image to the viewing angle of the human eye (S53). Thus, the image generation process ends.

Next, the extracted coordinates setting module 101 calculates the coordinates of an area to be extracted as the next frame based on moving speed and amount of movement contained in the extracted path information (S6). The extracted coordinates setting module 101 then determines whether to continue shifting extracted coordinates (S7).

That is, at S7, the extracted coordinates setting module 101 determines whether there is an area to be extracted, i.e., an area to which the extraction of coordinates shift. More specifically, at S7, the extracted coordinates setting module 101 determines whether the current extracted coordinates reach the end point indicated by the extracted path information. If the extracted coordinates setting module 101 determines to continue shifting extracted coordinates (Yes at S7), the process returns to S4. If not (No at S7), the process ends.

As described above, according to the embodiment, the image processor 9 repeats the process from S4 to S7 with respect to an input image from the starting point to the end point specified by the extracted path information. With this, perspective deformation is corrected such that the input image looks natural. Thus, it is possible to generate a moving image in which display areas that closely match the viewing angle of the human eye sequentially shift. For example, from the moving image generated by the image processor 9 and displayed on the display module 11, the user feels a realistic sensation as if he/she is viewing the real scene.

While the image processing apparatus of the embodiment is described above as being applied to the display device 1 such as a digital television comprising the antenna 2, the tuner 3, the broadcast signal demodulator 4, and the like, it may be applied to other display devices than the digital television. Besides, the image processing apparatus of the embodiment may comprise only the image processor 9, and performs the image processing as described above based on the image data 31 and the auxiliary data 32 to output an image.

Figure 10:
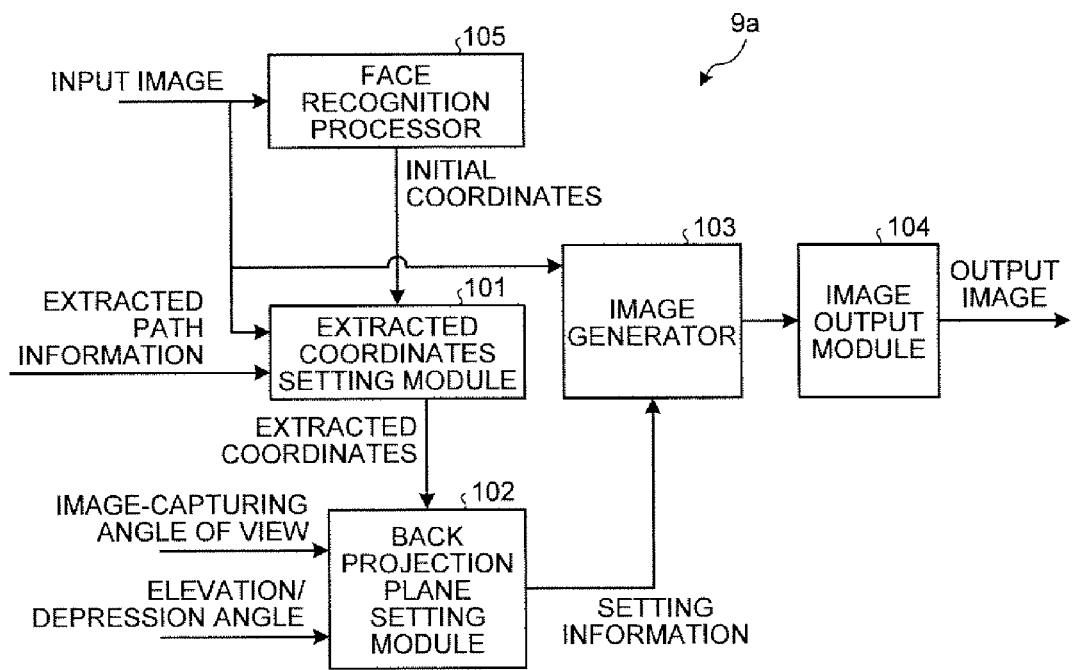
FIG. 10 is an exemplary block diagram of an image processor according to a first modification of the embodiment.

A description will be given of a first modification of the image processor 9 described in the above embodiment with reference to FIG. 10. FIG. 10 is a block diagram of an image processor 9a according to the first modification.

As illustrated in FIG. 10, the image processor 9a further comprises a face recognition processor 105. The face recognition processor 105 recognizes an area of an input image that matches a predetermined feature amount of a person's face (for example, the positions of the parts of a face such as eyes, ears, mouth, nose, etc., and the positional relationship among them) as a face area. The face recognition processor 105 outputs coordinates representing the recognized face area (for example, coordinates of the center of the face area) to the extracted coordinates setting module 101 as, for example, initial coordinates in the extracted path information.

As described above, according to the first modification, the image processor 9a can set an area to be extracted by the image generator 103 based on a person's face contained in an input image. For example, a snapshot with a wide angle field of view often contains a person as an object with a wide background. Even if receiving such a snapshot as an input image, the image processor 9a can specify an area to be extracted based on a person's face contained in the input image without setting of the extracted path information by the user to specify the person. Especially, if coordinates representing a face area is used as initial coordinates in the extracted path information, a moving image can be generated in which a person's face is displayed first, and then the background, etc. are displayed.

Figure 11:
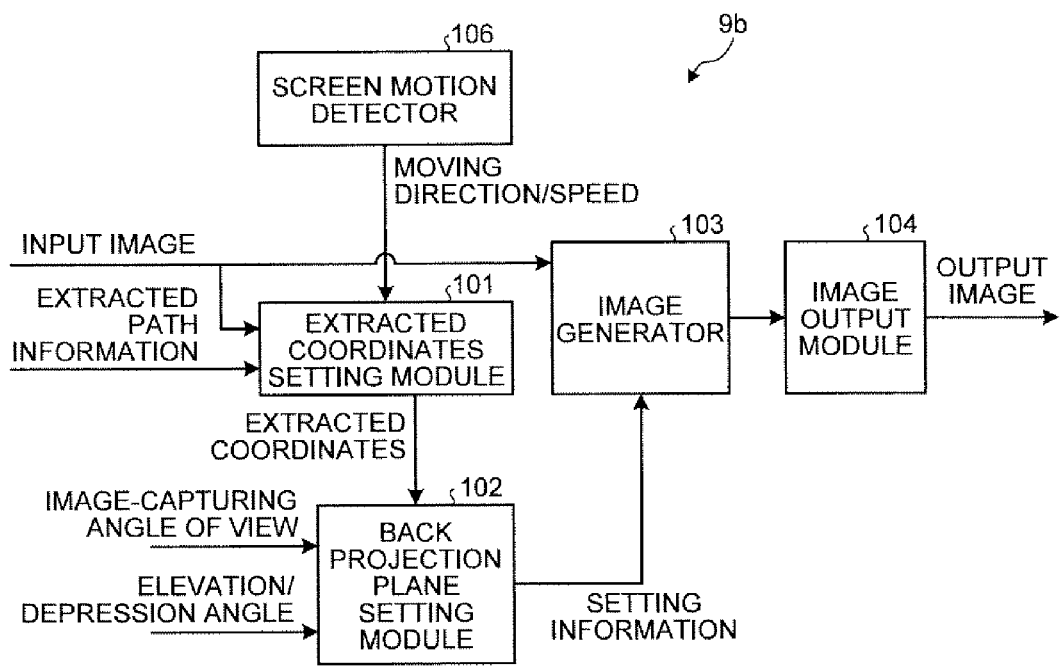
FIG. 11 is an exemplary block diagram of an image processor according to a second modification of the embodiment.

A description will then be given of a second modification of the image processor 9 described in the above embodiment with reference to FIG. 11. FIG. 11 is a block diagram of an image processor 9b according to the second modification.

As illustrated in FIG. 11, the image processor 9b further comprises a screen motion detector 106 that detects the motion of the screen (moving direction/speed) of the display module 11. The screen motion detector 106 may be, for example, an accelerometer that senses the motion of the screen of the display module 11. More specifically, the accelerometer is built in the display device 1 when the display module 11 is integrated with the housing of the display device 1. On the other hand, the accelerometer is built in the display module 11 when the display module 11 is separated from the housing of the display device 1. The image processor 9b sets the moving direction and speed of the screen detected by the screen motion detector 106 as the extracted path information.

As described above, according to the second modification, the image processor 9b can set an area to be extracted by the image generator 103 according to a direction/speed in/at which the user scrolls the screen of the display module 11. For example, if the screen is scrolled up and down, the image processor 9*b* shifts areas to be extracted up and down according to the motion of the screen, thereby generating a moving image viewed by the user as if he/she is viewing the scene up and down. Thus, a more natural user interface can be realized based on the motion of the screen.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
    an extracted coordinates setting module configured to set extracted coordinates in a captured image along a direction in which a viewpoint moves with respect to an object in the captured image;
    an image generator configured to sequentially extract partial areas from the captured image in which perspective deformation of the object has been corrected based on the extracted coordinates, and generate a plurality of partial area images from the partial areas, the partial areas being in a size corresponding to a viewing angle of human eye calculated according to an angle of view of the captured image; and
    an output module configured to output a moving image including the partial area images as frames.

2. The image processing apparatus of claim 1, further comprising a back projection plane setting module configured to set a back projection plane for back projection of the captured image based on a direction of an image capturing surface upon capturing the captured image, and set an angle of the back projection plane to be parallel to the image capturing surface, wherein
    the image generator is configured to correct the perspective deformation based on the angle of the back projection plane set by the back projection plane setting module.

3. The image processing apparatus of claim 2, wherein the back projection plane setting module is configured to correct an angle of the image capturing surface based on a position of the extracted coordinates in the captured image, and set the angle of the back projection plane to be parallel to the image capturing surface after correction.

4. The image processing apparatus of claim 1, further comprising a face detector configured to detect a face of a person in the captured image, wherein
    the extracted coordinates setting module is configured to set the extracted coordinates based on a position of the face detected by the face detector.

5. A display device comprising:
    a receiver configured to receive a captured image and information on the captured image;
    an extracted coordinates setting module configured to set extracted coordinates in a captured image along a direction in which a viewpoint moves with respect to an object in the captured image;
    an image generator configured to sequentially extract partial areas from the captured image in which perspective deformation of the object has been corrected based on the extracted coordinates, and generate a plurality of partial area images from the partial areas, the partial areas being in a size corresponding to a viewing angle of human eye calculated according to an angle of view of the captured image;
    an output module configured to output a moving image including the partial area images as frames; and
    a display module configured to display the moving image.

6. The display device of claim 5, wherein
    the display module comprising a screen motion detector configured to motion of a screen on which the moving image is displayed, and
    the extracted coordinates setting module is configured to set the extracted coordinates based on the motion of the screen detected by the screen motion detector.

7. An image processing method applied to an image processing apparatus comprising:
    an extracted coordinates setting module setting extracted coordinates in a captured image along a direction in which a viewpoint moves with respect to an object in the captured image;
    an image generator sequentially extracting partial areas from the captured image in which perspective deformation of the object has been corrected based on the extracted coordinates, and generating a plurality of partial area images from the partial areas, the partial areas being in a size corresponding to a viewing angle of human eye calculated according to an angle of view of the captured image; and
    an output module outputting a moving image including the partial area images as frames.

* * * * *